United States Patent
Vallee et al.

(10) Patent No.: US 12,422,256 B2
(45) Date of Patent: Sep. 23, 2025

(54) SIGHTING SYSTEM COMPRISING A SIGHTING DEVICE THAT CAN BE ORIENTED RELATIVE TO A BASE, THE SYSTEM BEING CAPABLE OF IMPLEMENTING A SIMPLE AND RAPID ON-SITE CALIBRATION METHOD

(71) Applicant: IXBLUE, Saint-Germain-en-Laye (FR)

(72) Inventors: Guillaume Vallee, Saint-Germain-en-Laye (FR); Bruno Crepy, Saint-Germain-en-Laye (FR)

(73) Assignee: EXAIL, Saint-Germain-en-Laye (FR)

( * ) Notice: Subject to any disclaimer, the term of this patent is extended or adjusted under 35 U.S.C. 154(b) by 891 days.

(21) Appl. No.: 17/615,715

(22) PCT Filed: Jun. 2, 2020

(86) PCT No.: PCT/EP2020/065237
§ 371 (c)(1),
(2) Date: Dec. 1, 2021

(87) PCT Pub. No.: WO2020/245128
PCT Pub. Date: Dec. 10, 2020

(65) Prior Publication Data
US 2022/0244047 A1 Aug. 4, 2022

(30) Foreign Application Priority Data
Jun. 3, 2019 (FR) ........................ 1905836

(51) Int. Cl.
*G01C 15/00* (2006.01)
*G01C 1/02* (2006.01)
*G02B 23/16* (2006.01)

(52) U.S. Cl.
CPC ............. *G01C 15/002* (2013.01); *G01C 1/02* (2013.01); *G02B 23/16* (2013.01)

(58) Field of Classification Search
CPC ........ G01C 15/002; G01C 1/02; G02B 23/16; G02B 23/14; F41G 3/02
See application file for complete search history.

(56) References Cited

U.S. PATENT DOCUMENTS 7,223,063 B2 * 5/2007 Jonas ..................... F16M 11/18
414/774
7,896,607 B2 * 3/2011 Jonas ................... F16M 11/123
414/816

(Continued)

FOREIGN PATENT DOCUMENTS

JP 2007514943 A * 6/2007
JP 2014-114973 6/2014

(Continued)

OTHER PUBLICATIONS

International Search Report for PCT/EP2020/065237 mailed Aug. 4, 2020, 5 pages.

(Continued)

*Primary Examiner* — Yaritza Guadalupe-McCall
(74) *Attorney, Agent, or Firm* — NIXON & VANDERHYE

(57) ABSTRACT

Disclosed is a sighting system including a sighting device orientable with respect to a base, adapted to implement a simple and fast on-site calibration method. The sighting system includes for that purpose a cradle holding to the base a sighting device provided with a line of sight. The sighting system includes a first tilt sensor attached to the base, a second tilt sensor attached to the sighting device. The tilt sensors are connected to a central unit adapted to measure a difference between the measurements made by each tilt sensor, in such a way as to quantify a tilt angle between the base and the sighting device, without it being necessary to use a voluminous tool.

20 Claims, 2 Drawing Sheets

(56) References Cited

U.S. PATENT DOCUMENTS

| | | | | |
|---|---|---|---|---|
| 8,393,849 B2* | 3/2013 | Jonas | ................ | F16M 11/2014 414/774 |
| 9,563,952 B2* | 2/2017 | Glimm | ..................... | G06T 7/33 |
| 9,932,719 B2* | 4/2018 | Ohtomo | ................ | G01S 3/783 |
| 11,500,096 B2* | 11/2022 | Nishita | ................ | G01S 7/4817 |
| 11,898,821 B2* | 2/2024 | Crepy | ................... | F16F 15/021 |
| 2007/0071588 A1* | 3/2007 | Jonas | .................... | F16M 11/18 414/784 |
| 2011/0142587 A1* | 6/2011 | Jonas | .................... | F16M 11/18 414/779 |
| 2012/0212622 A1* | 8/2012 | Nakamura | ........... | G01S 3/7864 348/169 |
| 2014/0375795 A1* | 12/2014 | Glimm | ................ | G01C 15/002 348/135 |
| 2016/0223327 A1* | 8/2016 | Norman | ................ | F16M 11/123 |
| 2017/0356158 A1* | 12/2017 | Ohtomo | ................ | E02F 9/262 |
| 2020/0132840 A1* | 4/2020 | Nishita | ................... | G01S 17/42 |
| 2022/0244047 A1* | 8/2022 | Vallee | .................... | G02B 23/16 |

FOREIGN PATENT DOCUMENTS

| | | | | |
|---|---|---|---|---|
| JP | 2014114973 A | * | 6/2014 | |
| WO | WO-2020245128 A1 | * | 12/2020 | ............... G01C 1/02 |

OTHER PUBLICATIONS

Written Opinion of the ISA for PCT/EP2020/065237 mailed Aug. 4, 2020, 6 pages.

* cited by examiner

[Fig. 1]
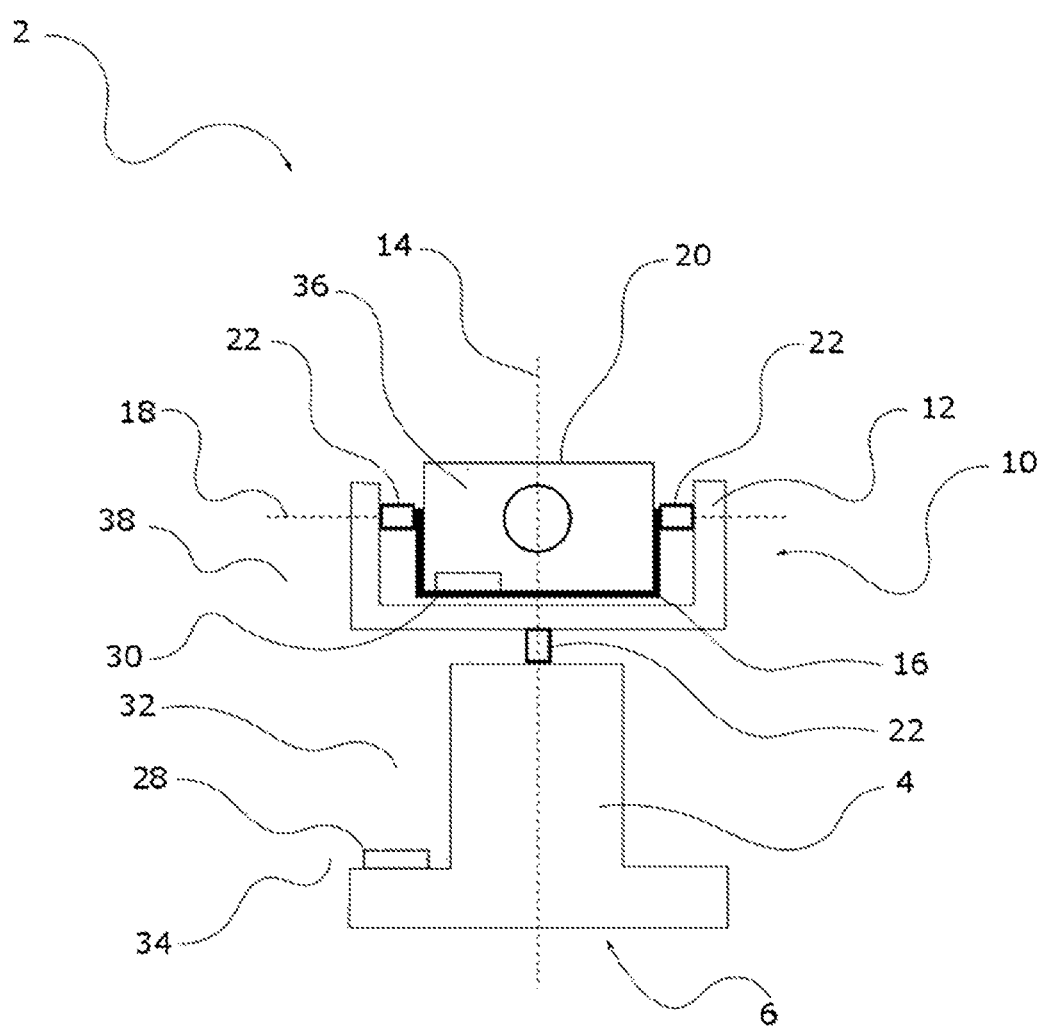

[Fig. 2]
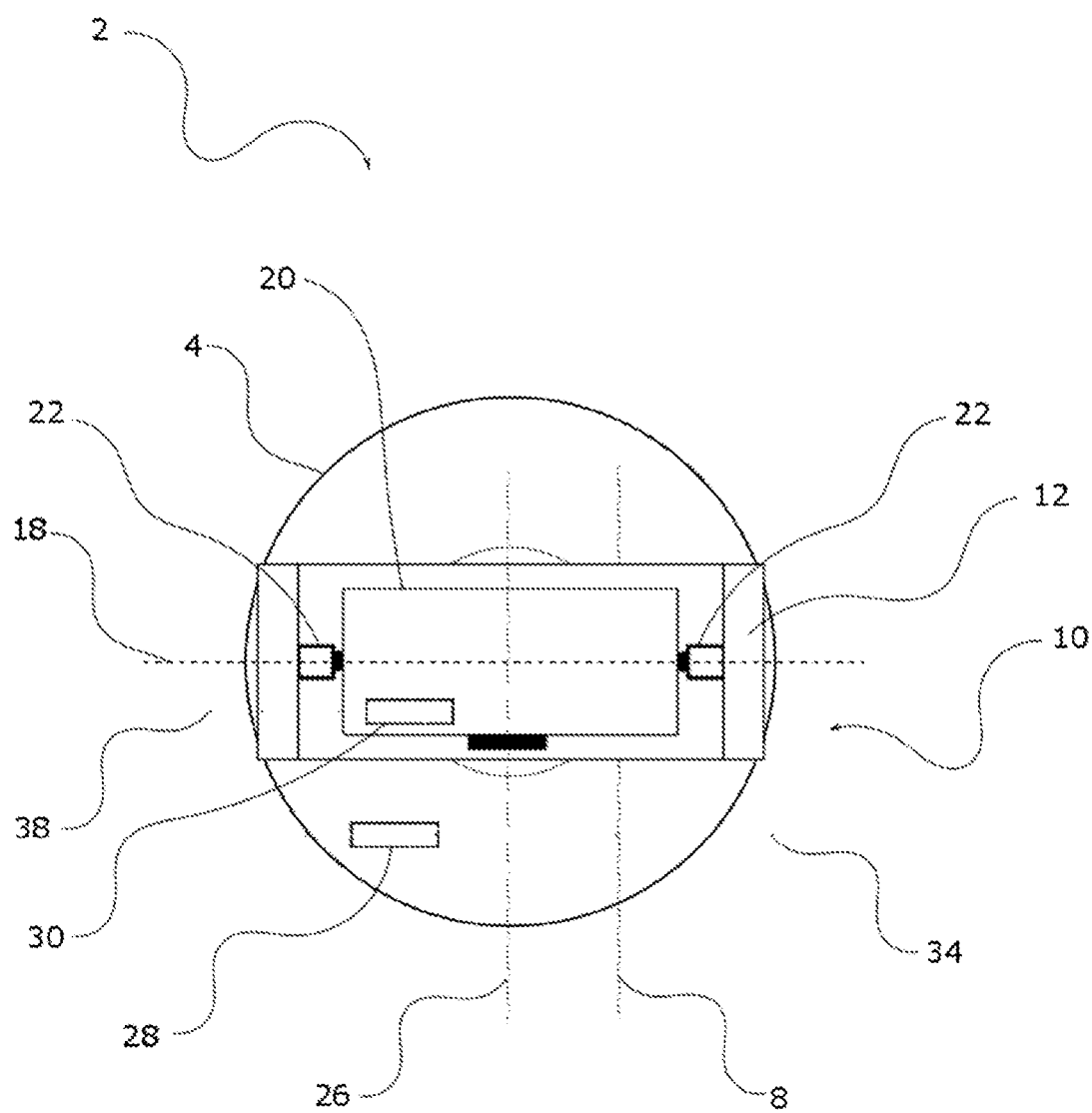

SIGHTING SYSTEM COMPRISING A SIGHTING DEVICE THAT CAN BE ORIENTED RELATIVE TO A BASE, THE SYSTEM BEING CAPABLE OF IMPLEMENTING A SIMPLE AND RAPID ON-SITE CALIBRATION METHOD

This application is the U.S. national phase of International Application No. PCT/EP2020/065237 filed Jun. 2, 2020 which designated the U.S. and claims priority to FR Patent Application No. 1905836 filed Jun. 3, 2019, the entire contents of each of which are hereby incorporated by reference.

TECHNICAL FIELD OF THE INVENTION

The present invention relates to a sighting system comprising a base supporting a cradle, the cradle holding a sighting device. The cradle is adapted to make the sighting device pivot with respect to the base, to allow the sighting device to point a target. The invention also relates to a method for simple and fast coupling between the line of sight of the sighting device and a location direction of the base.

STATE OF THE ART

As known, a sighting system makes it possible to point a target with respect to a reference frame. For that purpose, the sighting system comprises a base intended to be integral with the reference frame and a sighting device orientable with respect to the base. The sighting device is held to the base through a cradle, generally motorized, configured to make the sighting device pivot about one or several axes of rotation, in order to align a line of sight of said device to a target.

In order to accurately locate the target location with respect to the reference frame, it is essential to know the orientation of the line of sight with respect to the base. For that purpose, it is necessary to carry out a calibration method in order to couple the orientation of the line of sight with a location direction of the base. For reasons of simplicity, the calibration method consists in aligning the line of sight of the device with a location direction of the base before carrying out the coupling. The required accuracy is of the order of 100 μrad. To reach this accuracy, the calibration method requires the use of a voluminous instrument, an autocollimator, which is difficult to transport to site.

Most sighting systems integrate optronic devices. An optronic device is composed of an optical device coupled to an electronic device. By way of non-limitative examples, thermal cameras, night-vision googles or LASER telemeters are optronic devices. Because of the electronic components they contain, the optronic devices are less reliable than the components used for tilting of the cradle with respect to the base. It is thus more frequent to have to replace the optronic device than the tilting device. In order to keep the sighting system accuracy after replacement of the optronic device, it is necessary to proceed to a new calibration between the new optronic device and the base. Now, as mentioned hereinabove, the calibration method requires the use of instruments that are not available on site, because of their volume. Therefore, in case of failure of the sighting device, that is the whole sighting system that is returned to workshop, in order to carry out the calibration method in suitable conditions. This generates significant maintenance costs as well as a substantial downtime of the sighting system.

The invention aims to propose a sighting system comprising a sighting device orientable with respect to a base, adapted to implement a simple and fast on-site calibration method, in order to reduce both the duration and costs linked to the replacement of the sighting device in case of failure.

DISCLOSURE OF THE INVENTION

The invention thus proposes a sighting system comprising a base that supports a cradle. The cradle holds a sighting device having a line of sight. The cradle is adapted to make the sighting device pivot about at least one axis of rotation with respect to the base. The sighting system is characterized in that it comprises a first tilt sensor rigidly attached to the base, a second tilt sensor rigidly attached to the sighting device, as well as means for connecting each tilt sensor to a central unit, the central unit being adapted to measure a difference between the measurements made by each tilt sensor, in such a way as to quantify a tilt angle between the base and the sighting device.

Advantageously, the particular arrangement of the tilt sensors on the sighting system allows the central unit to determine at any time, in a simple and fast manner, a value relative to a tilt angle of the sighting device with respect to the base of the sighting system. By "tilt angle", it is meant an angle measured between an object and the earth's gravity axis. The sighting system is then adapted to implement one of the coupling methods described hereinafter, between the line of sight of the sighting device and a location direction of the base on a reference frame. The orientation of the line of sight of the device with respect to the reference frame on which the base is maintained can then be known in a simple and accurate manner on site, without having to use for that purpose voluminous instruments.

According to an alternative embodiment, the cradle is adapted to make the sighting device pivot about an axis of rotation called "site axis", orthogonal or substantially orthogonal to the line of sight of the sighting device.

According to an alternative embodiment, the cradle is adapted to make pivot about an axis of rotation called "bearing axis", orthogonal or substantially orthogonal to the site axis.

According to an alternative embodiment, the site axis is parallel or substantially parallel to a bearing face of the base, the bearing face being intended to be held against a reference frame. By "reference frame", it is meant for example a vehicle or a building.

According to an alternative embodiment, the cradle is held to the base through a fork, the fork being adapted to pivot with respect to the bearing axis and to make the cradle pivot with respect to the site axis. According to another alternative embodiment, the cradle is held at one end of an articulated arm, adapted to make the cradle pivot with respect to the bearing axis and the site axis.

According to an alternative embodiment, the sighting system comprises motor means controlled by the central unit, adapted to make the cradle pivot about the site axis and the bearing axis.

According to an alternative embodiment, the central unit comprises storage means, adapted to store at least one reference measurement associated with the first tilt sensor and at least one reference measurement associated with the second tilt sensor, the central unit also comprising means for comparing measurements made by the first and the second tilt sensor, with respect to the reference measurements associated with each tilt sensor.

According to an alternative embodiment, the central unit comprises communication means, adapted to indicate to a third-party device or to an operator, a value relative to a tilt angle between the fixed part of the cradle or the base, and the device held by the mobile part of the cradle, as a function of the calculation made by the comparison means.

According to an alternative embodiment, the first tilt sensor is positioned near a bearing face of the base, the bearing face being intended to be held against a reference frame. The shortest distance between the first tilt sensor and the bearing face is equal to or less than 5 cm. Particular care should be taken to ensure that the resting plane of the first tilt sensor and the bearing face are of same nature, in order to limit bias introduction in case of vibrations, shocks (by limiting the contact faces) or climate change (in order to limit the differential expansion).

According to an alternative embodiment, the second tilt sensor is positioned near the line of sight of the sighting device. The shortest distance between the second tilt sensor and the bearing face is equal to or less than 5 cm. Particular care should be taken to ensure that the resting plane of the second tilt sensor and the bearing face are of same nature, in order to limit bias introduction in case of vibrations, shocks (by limiting the contact faces) or climate change (in order to limit the differential expansion).

According to an alternative embodiment, each tilt sensor has a number of axes of measurement at least equal to the number of axes of rotation of the cradle with respect to the base. Preferably, the tilt sensors are arranged on the sighting system in such a way that their axes of measurement are parallel or substantially parallel to the axes of rotation of the cradle.

According to an alternative embodiment, the tilt sensors have an accuracy of measurement equal to or less than 0.001°. By way of non-limitative example, the tilt sensors implement the force-balance servo accelerometer technology.

According to an alternative embodiment, the sighting device comprises an optronic device. By way of non-limitative example, the optronic device may include a thermal cameral, a visible camera, a night-vision channel (light intensification) or a LASER telemeter.

The invention also relates to a mobile platform comprising a sighting system as defined hereinabove. A sighting system according to the invention can for example be mounted on a ship or a wheeled or tracked vehicle.

The invention also relates to a method for coupling a sighting system as described hereinabove, implementing the following steps:
a step of coupling the line of sight of the sighting device with a location direction of the base; then
a step of storing by the central unit at least one reference measurement for the first tilt sensor and at least one reference measurement for the second tilt sensor, when the sighting device is still with respect to the base.

According to an alternative embodiment, at least one reference measurement, associated with the first and the second tilt sensor, is stored by the central unit after the pivoting of the base about a site axis orthogonal or substantially orthogonal to a bearing face of the base, the bearing face being held against a reference frame, and the base is pivoted several times about the site axis in such a way as to carry out a complete rotation about said axis. Preferably, before each reference measurement stored by the central unit, the base is pivoted about the axis of rotation by an angle comprised between 25° and 185°, preferably an angle of the order of 180°, 90° or 45°.

The invention also relates to a method for coupling a sighting system as described hereinabove, implementing the following steps:
replacing the sighting device by another sighting device; then
making at least one measurement by the first and the second tilt sensor, when the cradle is still with respect to the base; then
comparing at least one measurement made by the first and the second tilt sensor with at least one reference measurement associated with the first and the second tilt sensor, in such a way as to identify the orientation of the line of sight of the device with respect to a location direction of the base.

According to an alternative embodiment, the central unit is configured to control the pivoting of the sighting device with respect to the base using motor means, until the measurements made by the first and the second tilt sensor are identical or substantially identical to the reference measurements associated with each tilt sensor.

DESCRIPTION OF THE FIGURES

The following description in relation with the appended drawings, given by way of non-limitative examples, will allow a good understanding of what the invention consists of and of how it can be implemented.

FIG. 1 shows a front view of an orientable sighting system according to the invention;

FIG. 2 shows a top view of an orientable sighting system illustrated in FIG. 1.

DESCRIPTION OF THE EMBODIMENTS

As a reminder, the invention proposes a sighting system comprising a sighting device orientable with respect to a base, adapted to implement a simple and fast on-site calibration method, in order to reduce both the duration and costs linked to the replacement of the sighting device in case of failure.

FIGS. 1 and 2 illustrate a non-limitative example of a sighting system 2 according to the invention. The sighting system 2 includes a base 4 with a bearing face 6 intended to be held against a reference frame not shown in the figures. By "reference frame", it is meant a mobile platform or a building. According to the present example, the bearing face 6 has a planar surface. The base 4 also includes a locator such as centering pins, materializing a location direction 8 of the base on the reference frame. The location direction 8 allows in particular an accurate angular location of the base on the reference frame (see FIG. 2). The location direction is preferably parallel or substantially parallel to the bearing face 6 of the base.

At an opposite end of the bearing face 6, an articulated structure 10 is mounted on the base 4. The articulated structure is composed of a fork 12 pivotable with respect to the base, about a first axis of rotation called "bearing axis". The bearing axis 14 is orthogonal or substantially orthogonal to the bearing face 6 of the base. The branches of the fork 12 hold a cradle 16 in such a way as to allow its pivoting about a second axis of rotation called "site axis". The site axis 18 is orthogonal or substantially orthogonal to the bearing axis 14.

The sighting system 2 is supplemented by a sighting device 20 mounted on the cradle 16. The sighting device 20 is reversibly mounted on the cradle 16 to allow the replacement thereof, in case of failure, by a similar device. The sighting device 20 is rigidly attached to the cradle 16, in such a way that the articulated structure 10 can make the sighting device accurately pivot with respect to the base 4 to align a line of sight 26 of said device to a target. The sighting device 20 is preferably an optronic device such as a thermal cameral, a visible camera, a light-intensification night-vision channel or a LASER telemeter.

The sighting system 2 also comprises motor means 22 adapted to cause the pivoting of the fork 12 about the bearing axis 14 as well as the pivoting of the cradle 16 about the site axis 18. The motor means 22 are controlled by a central unit 24. According to the present example, the central unit 24 is separate from the sighting system 2. This embodiment is not limitative, and the central unit 24 could be integral with the sighting system.

As mentioned hereinabove, when the sighting system 2 is associated with a reference frame, it is necessary to know as accurately as possible the location of the line of sight 26 with respect to the reference frame, to allow an accurate identification of the target location, followed by the sighting system 2, with respect to the reference frame. In other words, the orientation of the line of sight 26 with respect to the location direction 8 of the base 4 must be known at any time. In order to reference the line of sight 26 with respect to the reference frame, it is necessary to couple or to harmonize the line of sight 26 with the location direction 8 of the base. Hence, when the line of sight 26 is aligned to a target, the target heading with respect the base, and hence indirectly with respect to the reference frame, is known. The coupling between these two directions must be carried out with an accuracy less than 100 µrad. To reach this degree of accuracy, it is necessary to place the sighting system on a support, equipped with a reference mirror, and to use an optical referencing tool comprising an autocollimator. The coupling method hence requires the use of fragile and voluminous elements, difficult to transport and use on site. That is the reason why the calibration method is to date only carried out at the workshop. Therefore, in case of failure of the sighting device, it is necessary to return the whole sighting system to the workshop, in order to replace the sighting device then to carry out a new method of calibration of the sighting system. This generates significant maintenance costs and a relatively long downtime of the system.

The invention aims to offer means making it possible to determine on site, in a simple, fast and accurate manner, the tilt angle formed between the location direction of the base 4 and the line of sight 26 of a replacement sighting device, without implementing the sophisticated tool mentioned hereinabove and available only at the workshop.

In order to solve the technical problems mentioned hereinabove, the invention differs from the state of the art in that the sighting system comprises a first tilt sensor 28 attached to the base 4, and a second tilt sensor 30 attached to the sighting device 20. By "tilt sensor", it is meant means adapted to measure an angle between an object and the earth's gravity axis. Each sensor is rigidly attached to its support, in such a way that its tilt with respect to its support is constant or substantially constant over time. Each tilt sensor comprises a number of axes of measurement equal to or greater than the number of axes of rotation of the cradle 16. As such, a tilt sensor can comprise several physically separate sensors, each including a smaller number of axes of measurement. The tilt sensors are adapted to carry out tilt value measurements with an accuracy of the order of 0.001°. The tilt sensors can be identical, such as for example force-balance servo accelerometers.

According to the present example, the first tilt sensor 28 has two axes of measurement orthogonal or substantially orthogonal to each other. The first tilt sensor 28 is held as close as possible to the bearing face 6 of the base 4, at a distance equal to or less than 5 cm, preferably equal to or less than 2 cm. The first tilt sensor 28 is oriented in such a way that a first axis of measurement 32 of the sensor is parallel or substantially parallel to the bearing axis 14, and a second axis of measurement 34 of the sensor is parallel or substantially parallel to the site axis 18.

The second tilt sensor 30 also has two axes of measurement orthogonal or substantially orthogonal to each other. The second tilt sensor 30 is held as close as possible to the line of sight 26 of the sighting device 20, at a distance equal to or less than 5 cm, preferably equal to or less than 2 cm. The second tilt sensor 20 is oriented in such a way that a first axis of measurement 36 of the sensor is parallel or substantially parallel to the bearing axis 14, and a second axis of measurement 38 of the sensor is parallel or substantially parallel to the site axis 18.

The tilt sensors are connected to the central unit 24 by connection means, to transmit in real time to the central unit 24 the tilt angle measurements made. The central unit 24 comprises storage means 40 adapted to store reference tilt angle values or reference measurements, and at least one coupling method described hereinafter. The central unit 24 also includes calculation means 42 such as a calculator, adapted to perform comparisons between tilt angle measurements made by the tilt sensors and reference tilt angle values, previously stored by the storage means 40. The central unit 24 can also include communication means 44. The communication means are adapted to indicate to a third-party device or to an operator an orientation of the line of sight 26 with respect to the location direction 8 of the base, as a function of the operations carried out by the calculation means 42.

The sighting system 2 advantageously allows the implementation of a coupling method at the workshop, then a coupling method on site, as described hereinafter, between the line of sight of the sighting device and the location direction of the base.

Origin Coupling Method

The above-described sighting system is obtained following the assembly at the workshop of the different elements described hereinabove. After the mounting, for the first time, of the sighting device 20 on the cradle 16 carried by the base 4, it is necessary to carry out an "origin" coupling method. The origin coupling method aims to reference the line of sight of the sighting device and the location direction of the base, in such a way that, when the line of sight points a target, the target heading with respect to the base can be known with an accuracy equal to or less than 0.001°. The origin coupling method is carried out at the workshop and is divided into two separate and successive phases of harmonization, as described hereinafter.

Phase of Harmonization of the First Tilt Sensor with Respect to the Bearing Face of the Base The phase of harmonization of the first tilt sensor consists in straightening the values measured by the first tilt sensor 28, with respect to the surface of the reference frame on which the sighting system will be mounted. By "straightening", it is meant the fact to correct the misalignments between the plane defined by the two measurement axes of the first tilt sensor and the surface of contact with the surface of the reference frame. This measurement is not direct insofar as the first tilt sensor give information about an angular distance between the bearing face 6 of the base and the earth's gravity axis. Now, it is desired to know the distance between the bearing face of the inclinometer and the bearing surface 6 of the base. For that purpose, several steps will be implemented. The phase of harmonization of the first tilt sensor implements a first step, consisting in placing the bearing face 6 of the base of the sighting system 2 against a laboratory marble. By "laboratory marble", it meant a horizontal or substantially horizontal planar surface, whose flatness is greater than the flatness of the bearing face 6 of the base.

During a second step, the central unit 24 records the values of the tilt angles measured by the first tilt sensor 28 and stores them as first values. In a third step, the base 4 is pivoted about the bearing axis 14 by a reference angle, 180° in the present example, then the central unit 24 records the values of the tilt angles measured by the first tilt sensor 28 and stores them as second values. In a fourth step, the central unit 24 calculates offset values D, between the flatness of the bearing face 6 of the base and the flatness of the marble, in order to eliminate the absolute tilts of the laboratory marble and to keep only the relative tilts between the first tilt sensor 28 and the bearing face 6. By way of non-limitative example, the offset values D are calculated as follows when the value of the reference tilt angle is equal to 180°, by subtracting the second measured value from the first measured value, for each axis of measurement.

These offset values D are stored by the storage means 40 of the central unit 24, in such a way as to straighten the values measured by the first tilt sensor 28, with respect to the surface of the reference frame on which the sighting system will be mounted.

Phase of Harmonization of the Second Sensor with the First Tilt Sensor

The second phase of harmonization consists in using an optical referencing tool as mentioned hereinabove. According to a first step, an autocollimator is secured to the base in such a way that its optical axis is aligned with the location direction 8 of the base, with an accuracy equal to or less than 100 µrad. The articulated structure 10 is subsequently set in motion to pivot the cradle 16 about the bearing axis 14 and the site axis 18, until the line of sight 26 and the location direction 8 are aligned or substantially aligned with each other, according to the autocollimator, with an accuracy equal to or less than 100 µrad.

In a second step, when the line of sight and the location axis are collinear with each other, the central unit 24 reads the tilt angle values measured by the first tilt sensor 28 and the second tilt sensor 30. These tilt angle values are stored, by the storage means 40 of the central unit, as reference tilt angle values or reference measurements for each sensor.

On-Site Coupling Method

The above-described origin coupling method advantageously allows the implementation of a coupling method on site, without it being necessary for that purpose to use the optical referencing tool used at the workshop.

Indeed, to carry out an on-site coupling method, it is just necessary to implement a first step consisting in pivoting the cradle 16 by a certain angle, about the bearing axis 14 and the site axis 18, before immobilizing it. In a second step, the central unit 14 reads the tilt angle values measured by the first tilt sensor 28 and the second tilt sensor 30. In a third step, the tilt angle values measured by each axis of measurement of the tilt sensors are compared with the reference tilt angle values stored and associated with each axis of measurement of said sensors. As a reminder, the reference tilt angle values correspond to the values stored during the phase of harmonization of the second tilt sensor with the first tilt sensor as described hereinabove. In the case where the difference between at least one measured value and an associated reference tilt angle value is equal to or greater than a threshold value, the two steps of the on-site coupling method are reproduced. In the case where the difference between each measured value and each associated reference tilt angle value is less than the threshold value, the central unit 24 sends to a third-party device or to an operator a confirmation message of the correct alignment between the line of sight 26 and the location direction 8, in a plane parallel or substantially parallel to the bearing face 6 of the base.

Therefore, the sighting system 2 according to the invention allows the implementation of an on-site coupling method, in a simple and fast manner, without it being necessary to use a voluminous optical referencing tool.

According to an alternative embodiment of the above-described on-site coupling method, the cradle 16 is continuously or sequentially pivoted about the bearing axis 14 and the site axis 18, until the values measured by the first and the second inclinometer are identical or substantially identical to the reference tilt angle values associated with each inclinometer. The cradle is then oriented according to an "origin" location with respect to the base 4. The values measured by the first and the second inclinometer are then recorded by the central unit 24 as new "origin" values in azimuth and elevation for the sighting device 20. In other words, when the cradle 16 will be oriented again in the "origin" location with respect to the base, the azimuth and elevation values of the sighting device will be considered zero by the central unit.

On-Site Sighting-Device Replacement Method

Thanks to the invention, it is now possible to replace on site a failing sighting device 20 by another sighting device, without it being necessary for that purpose to return the whole sighting system 2 to the workshop. For that purpose, it is just necessary to proceed to a first replacement step consisting in taking off the failing sighting system 2 from the cradle 16. In a second step, an operational replacement sighting device, including a second tilt sensor 30 according to the invention, is mounted on the cradle 16 in place of the previous sighting device. It is to be noted that the replacement sighting device has previously been calibrated, within the meaning of the invention and in accordance with the method of harmonization of the second tilt sensor described hereinabove. The replacement device has been calibrated with the same base 4 and the same articulated structure 10 as the present sighting system or with a similar base and articulated structure, comprising a first tilt sensor positioned identically to the base of said sighting system. At a third step, the reference tilt angle values associated with the second tilt sensor present on the replacement sighting device are stored by the central unit 24 of the sighting system. Then, in a fourth step, the above-described on-site coupling method is implemented.

In other words, by reproducing the calibration method at the workshop for an identical series of sighting systems, it is subsequently possible to replace the sighting devices between each other in order, for example, to replace a failing sighting device by an operational sighting device. It is then easy and fast to carry out an accurate calibration on site, without using a voluminous optical referencing tool.

The sighting system and the calibration methods according to the invention hence make it possible to reduce both the cost and maintenance time of a sighting system.

The invention claimed is:

1. A sighting system comprising:
   a cradle holding a sighting device having a line of sight;
   a base supporting the cradle, the cradle being configured to make the sighting device pivot about at least one axis of rotation with respect to the base;
   a first tilt sensor rigidly attached to the base;
   a second tilt sensor rigidly attached to the sighting device;
   a calculator; and
   a connector configured to connect each of the first tilt sensor and the second tilt sensor to the calculator, the calculator being configured to measure a difference between measurements made by each of the first tilt sensor and the second tilt sensor to quantify a tilt angle between the base and the sighting device.

2. The sighting system according to claim 1, wherein the cradle is configured to make the sighting device pivot about a site axis, orthogonal or substantially orthogonal to the line of sight of the sighting device.

3. The sighting system according to claim 2, wherein the cradle is configured to make the sighting device pivot about a bearing axis, orthogonal or substantially orthogonal to the site axis.

4. The sighting system according to claim 3, wherein the cradle is held to the base through a fork, the fork being configured to pivot with respect to the bearing axis and to make the cradle pivot with respect to the site axis.

5. The sighting system according to claim 4, further comprising a motor controlled by the calculator, the motor being configured to make the cradle pivot about the site axis and the bearing axis.

6. The sighting system according to claim 3, further comprising a motor controlled by the calculator, the motor being configured to make the cradle pivot about the site axis and the bearing axis.

7. The sighting system according to claim 3, wherein the site axis is parallel or substantially parallel to a bearing face of the base, the bearing face being configured to be held against a reference frame.

8. The sighting system according to claim 2, wherein the site axis is parallel or substantially parallel to a bearing face of the base, the bearing face being configured to be held against a reference frame.

9. The sighting system according to claim 8, wherein the cradle is held to the base through a fork, the fork being configured to pivot with respect to the bearing axis and to make the cradle pivot with respect to the site axis.

10. The sighting system according to claim 8, further comprising a motor controlled by the calculator, the motor being configured to make the cradle pivot about the site axis and the bearing axis.

11. The sighting system according to claim 1, wherein the calculator comprises
   a storage configured to store at least one reference measurement associated with the first tilt sensor and at least one reference measurement associated with the second tilt sensor, and
   one or more processors configured to compare the measurements made by the first tilt sensor and the second tilt sensor, with respect to the reference measurements associated with each of the first tilt sensor and the second tilt sensor.

12. The sighting system according to claim 1, wherein the first tilt sensor is positioned near a bearing face of the base, the bearing face being configured to be held against a reference frame.

13. The sighting system according to claim 1, wherein the second tilt sensor is positioned near the line of sight of the sighting device.

14. The sighting system according to claim 1, wherein the sighting device comprises an optronic device.

15. A mobile platform comprising:
   the sighting system according to claim 1.

16. A method for coupling the sighting system according to claim 1, the method comprising:
   coupling the line of sight of the sighting device with a location direction of the base; and
   storing, by the calculator, at least one reference measurement for the first tilt sensor and at least one reference measurement for the second tilt sensor, when the sighting device is still with respect to the base, after the coupling the line of sight of the sighting device.

17. The coupling method according to claim 16, wherein the at least one reference measurements respectively associated with the first tilt sensor and the second tilt sensor, are stored by the calculator after the pivoting of the base about a site axis, orthogonal or substantially orthogonal to a bearing face of the base, the bearing face being held against a reference frame, and the base being pivoted several times about the site axis to carry out a complete rotation about said site axis.

18. The coupling method according to claim 17, further comprising:
   replacing the sighting device by another sighting device;
   respectively making at least one measurement by the first tilt sensor and the second tilt sensor, when the cradle is still with respect to the base, after replacing the sighting device; and
   comparing the at least one measurement respectively made by the first tilt sensor and the second tilt sensor with the at least one reference measurement respectively associated with the first tilt sensor and the second tilt sensor, to identify the orientation of the line of sight of the device with respect to a location direction of the base.

19. The coupling method according to claim 16, further comprising:
   replacing the sighting device by another sighting device;
   respectively making at least one measurement by the first tilt sensor and the second tilt sensor, when the cradle is still with respect to the base, after replacing the sighting device; and
   comparing the at least one measurement respectively made by the first tilt sensor and the second tilt sensor with the at least one reference measurement respectively associated with the first tilt sensor and the second tilt sensor, to identify the orientation of the line of sight of the device with respect to a location direction of the base.

20. The coupling method according to claim 16, wherein the calculator is configured to control pivoting of the sighting device with respect to the base using a motor, until the measurements made by the first tilt sensor and the second tilt sensor are identical or substantially identical to the reference measurements associated with each of the first tilt sensor and the second tilt sensor.

* * * * *